(12) United States Patent
Murphy et al.

(10) Patent No.: US 8,287,974 B2
(45) Date of Patent: *Oct. 16, 2012

(54) POLYOL-BASED RELEASE PAPER, ARTICLES, AND METHODS

(75) Inventors: Christopher B. Murphy, Woodridge, IL (US); Jon O. Fabri, Charleston, SC (US)

(73) Assignee: Polymer Ventures, Inc., Charleston, SC (US)

( * ) Notice: Subject to any disclaimer, the term of this patent is extended or adjusted under 35 U.S.C. 154(b) by 81 days.

This patent is subject to a terminal disclaimer.

(21) Appl. No.: 12/624,871

(22) Filed: Nov. 24, 2009

(65) Prior Publication Data

US 2010/0304071 A1 Dec. 2, 2010

Related U.S. Application Data

(63) Continuation-in-part of application No. 12/476,037, filed on Jun. 1, 2009, now Pat. No. 7,939,138.

(51) Int. Cl.
*B32B 33/00* (2006.01)
*B32B 27/12* (2006.01)
*B32B 7/12* (2006.01)
*B32B 5/28* (2006.01)

(52) U.S. Cl. .......... 428/41.8; 428/42.3; 442/59; 442/85; 442/151

(58) Field of Classification Search ............... 428/41.8, 428/221, 446, 688; 442/59–181; 427/302, 427/303, 407.1
See application file for complete search history.

(56) References Cited

U.S. PATENT DOCUMENTS

| | | |
|---|---|---|
| 3,112,214 A | 11/1963 | Roberts et al. |
| 3,218,191 A | 11/1965 | Domanski |
| 3,481,764 A * | 12/1969 | Kohjiro et al. ................ 427/341 |
| 3,650,805 A | 3/1972 | Imoto et al. |
| 3,758,324 A | 9/1973 | Barrett |
| 4,117,199 A | 9/1978 | Gotoh et al. |
| 4,386,183 A * | 5/1983 | Wempe ........................ 524/405 |
| 4,559,186 A | 12/1985 | Lee |
| 4,624,985 A | 11/1986 | Tsutsumi et al. |
| 4,684,557 A | 8/1987 | Pennace et al. |
| 4,960,639 A | 10/1990 | Oda et al. |
| 5,110,390 A | 5/1992 | Martini et al. |
| 5,141,797 A | 8/1992 | Wheeler |
| 5,212,228 A | 5/1993 | Sistrunk |
| 5,283,090 A | 2/1994 | Umemura |

(Continued)

FOREIGN PATENT DOCUMENTS

EP 0493100 A1 7/1992

(Continued)

OTHER PUBLICATIONS

Article: The Gelation of Polyvinyl Alcohol with Borax; Title: A Novel Class participation Experiment Involving the Preparation and properties of Slime; Authors: E. Z. Casassa, A. M. Sarquis, C. H. Van Dyke; vol. 63 No. 1; Dated: Jan. 1986; pp. 57-60.

(Continued)

*Primary Examiner* — Jennifer A Steele
(74) *Attorney, Agent, or Firm* — Marshall, Gerstein & Borun LLP

(57) ABSTRACT

Disclosed herein is an adhesive release article comprising an absorbent substrate, a cross-linking agent, and a polymer; wherein the substrate is first coated with the cross-linking agent and is then coated with the polymer.

18 Claims, 3 Drawing Sheets

U.S. PATENT DOCUMENTS

| | | | |
|---|---|---|---|
| 5,380,586 A | | 1/1995 | Knoerzer et al. |
| 5,428,094 A | | 6/1995 | Tokoh et al. |
| 5,468,526 A | | 11/1995 | Allen et al. |
| 5,512,338 A | | 4/1996 | Bianchini et al. |
| 5,547,764 A | | 8/1996 | Blais et al. |
| 5,604,042 A | | 2/1997 | Bianchini et al. |
| 5,981,011 A | * | 11/1999 | Overcash et al. ............ 428/40.9 |
| 6,113,978 A | | 9/2000 | Ornstein et al. |
| 6,200,644 B1 | | 3/2001 | Ulfstedt et al. |
| 6,495,223 B1 | | 12/2002 | Berlin |
| 6,703,120 B1 | | 3/2004 | Ko et al. |
| 7,288,514 B2 | | 10/2007 | Scheuing et al. |
| 7,306,944 B2 | | 12/2007 | Choi et al. |
| 2005/0042443 A1 | | 2/2005 | Miller et al. |
| 2007/0092718 A1 | | 4/2007 | Murphy et al. |
| 2008/0003384 A1 | | 1/2008 | Murphy et al. |
| 2008/0064814 A1 | | 3/2008 | Yamamoto et al. |
| 2008/0268242 A1 | | 10/2008 | Zhou et al. |
| 2008/0281042 A1 | | 11/2008 | Soane et al. |
| 2008/0299347 A1 | * | 12/2008 | Ukei et al. ................... 428/41.8 |
| 2009/0098303 A1 | | 4/2009 | Murphy et al. |
| 2009/0133827 A1 | * | 5/2009 | Wozniak et al. .............. 156/277 |

FOREIGN PATENT DOCUMENTS

| | | |
|---|---|---|
| EP | 1111452 A2 | 6/2001 |
| EP | 1078774 B1 | 11/2004 |
| WO | WO-2006003391 A1 | 1/2006 |
| WO | WO-2010141277 A1 | 12/2010 |

OTHER PUBLICATIONS

Book Polymer Modified textile Materials; Author: Jerzy Wypych; A Wiley-Interscience Publication; Copyright © 1988 by John Wiley & Sons, Inc.

Article: A Review of Paper Coating. Paper Coating Technologies in the 20th Century. Author: Fukui Terunobu; Journal Title: Japan Tappi Journal; Journal Code: G0115A; ISSN: 0022-815X; vol. 55; No. 12; pp. 1651-1667 (2001).

Article: Journal of Membrane Science 322 (2008); Title: Preparation and pervaporation performance of surface crosslinked PVA/PES composite membrane; Authors: Ruili Guo, Xin Fand, Hong Wu, Zhongyi Jiang*; pp. 32-38.

Author: Donatas Satas; 23. Release Coatings; Handbook of Pressure Sensitive Adhesive Technology (1989); pp. 585-600; Van Nostrand Reinhold, New York.

Authors: J. Darrell Jones and Yolanda A. Peters; 24. Silicone Release Coatings; Handbook of Pressure Sensitive Adhesive Technology (1989); pp. 601-626; Van Nostrand Reinhold, New York.

Authors: Donatas Satas and A. Maria Satas; 33. Labels; Handbook of Pressure Sensitive Adhesive Technology (1989); pp. 745-766; Van Nostrand Reinhold, New York.

International Search Report and Written Opinion for corresponding International application No. PCT/US2010/036123, dated Aug. 5, 2010.

Extended European Search Report for EP 11178070.6 mailed Oct. 28, 2011.

* cited by examiner

POLYOL-BASED RELEASE PAPER, ARTICLES, AND METHODS

CROSS-REFERENCE TO RELATED APPLICATION

This application is a continuation-in-part of pending U.S. patent application Ser. No. 12/476,037, filed Jun. 1, 2009. The disclosure of which is incorporated herein by reference.

FIELD OF THE DISCLOSURE

The disclosure generally relates to improved release (adhesion-resistant) coatings, articles, and methods, more specifically, to polyol-based release coatings on substrates, such as papers and laminates, or adhesives or adhesive-coated articles in contact with the release coating of a release-coated article.

BRIEF DESCRIPTION OF RELATED TECHNOLOGY

Commercial markers and products, such as tapes, labels, and adhesive coated sheets, must be protected from adhesion to unintended surfaces. Generally, these markers and products are protected by covering the adhesive surface with an adhesion-resistant substrate. Often these adhesion-resistant substrates are secondary sheets containing an adhesion-resistant side, or in the case of tapes, the adhesion-resistant side is the backing of the tape which allows for winding. Most desirably, the adhesion-resistant substrate can be easily and completely removed from the adhesive to allow application of the adhesive, adhesive coated tape, label, or sheet to another surface.

These adhesive coated articles, usually coated with a pressure sensitive adhesive, are almost exclusively protected from adhesion by silicone-based release coatings or coated substrates. A general review of silicone release coatings can be found in J. D. Jones and Y. A. Peters "Silicone Release Coatings", *Handbook of Pressure Sensitive Adhesive Technology*, $2^{nd}$ Ed., 601-626 (D. Satas, ed. 1989). The silicone based adhesion-resistant coating compositions, e.g., compositions based on polydimethylsiloxane, are readily available as emulsions, solvent solutions, and as solventless materials for the application to substrates to yield adhesion-resistant substrates after curing on a substrate at 300-400° F.

Alternative examples are the surfactant-polyol polyol coating compositions for adhesion-resistance and contact with pressure-sensitive adhesives disclosed in U.S. Pat. No. 4,386,183. Therein, polyols are coupled with surfactants to theoretically provide a surfactant-exposed polyol coating on an absorbent substrate. The compositions include surfactant bindings-agents, e.g., zinc salts and boric acid, to facilitate the surfactant exposure on the surface of the polyol coatings.

While adhesive coated articles are finding wide spread use, the adhesion-resistant substrates are thrown away. Examples of adhesive coated articles backed by adhesion-resistant substrates include printable labels for personal or commercial use. These labels include printable address labels, contact sheets, shelf markers, drum labels, adhesive backed RFIDs, stickers, and the like. Often, printable labels are designed to be fed through a printer, where the silicone coating on the adhesion-resistant surface of the adhesion-resistant substrate must be first treated with a friction coating. The friction coating assists with the feeding and movement of the product through the printer, e.g., an inkjet printer.

The adhesion-resistant substrates are thrown away because the commonly used polydimethylsiloxane coated papers are inherently difficult to recycle causing high unpredictability in performance and composition of the recycled paper. As a result, most coated papers are excluded from the recycling process and generally increase the amount of material added to landfills.

Generally, the prior art neither sufficiently teaches nor suggests to one of ordinary skill in the art the manufacture of release (adhesion-resistant) substrates, release articles or methods of reducing adhesion to absorbent substrates, wherein an absorbent substrate is coating with an adhesion-resistant coating comprising a cross-linked polyvinyl alcohol. The prior art does not teach or suggest a method of increasing the adhesion-resistance of an absorbent substrate by applying to the substrate a cross-linked PVOH film or coating that provides excellent adhesion resistance with a very low loading of the polymer. The prior art does not teach or suggest a low temperature process for curing an adhesion-resistant coating. Additionally, the prior art neither teaches nor suggests a recyclable and biodegradable release substrate.

SUMMARY OF THE INVENTION

Disclosed herein is an article formed from an absorbent substrate and a cross-linked poly(vinyl alcohol) that exhibits excellent adhesive release, a method for making and using the same, and articles employing the same.

Additional features of the invention may become apparent to those skilled in the art from a review of the following detailed description, taken in conjunction with the drawings, the examples, and the appended claims.

BRIEF DESCRIPTION OF THE DRAWING FIGURES

For a more complete understanding of the disclosure, reference should be made to the following detailed description and accompanying drawing wherein FIG. 1 is a drawing of a Fourdrinier paper machine.

Figure 1:
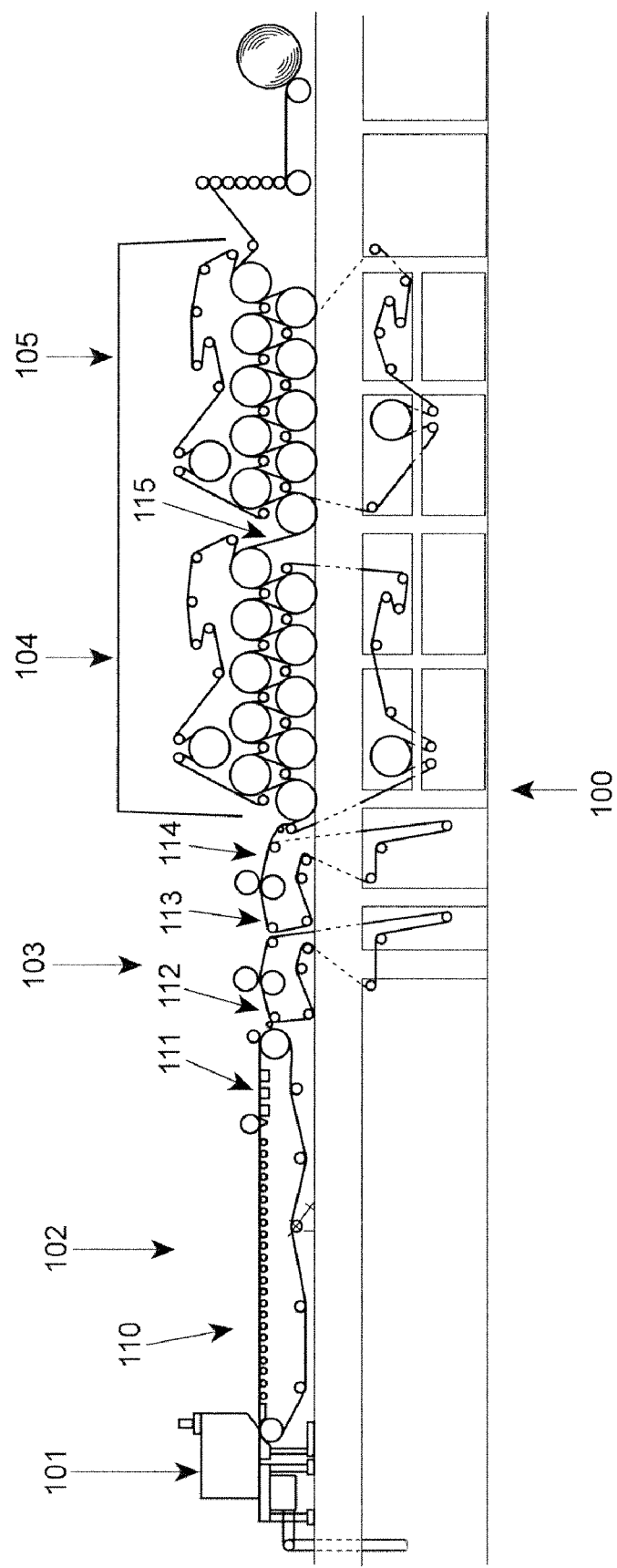

While the disclosed articles and methods are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF THE INVENTION

The articles and methods described herein may be understood more readily by reference to the following detailed description and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The articles and methods described herein generally relate to environmentally safe, adhesion-resistant substrates, articles, and methods. An important aspect of the development of new industrial chemicals and processes is the reduction of the environmental hazards associated with the chemicals and/or processes. Apart from the direct health implications of toxic materials, industrial use of hazardous material is increasing manufacturing costs due to, in part, emission restrictions. Herein, the adhesion-resistant substrates, coatings, articles, and methods for manufacture, employ materials significantly less hazardous to people and the environment, than those currently employed. Moreover, the coatings and coated articles described herein neither contaminate nor impede recycling processes.

The adhesion-resistant substrates described herein are made by applying coatings to substrates that are initially water-absorbent. The absorbency of water by a substrate can occur for example by capillary action, hydrophilic interactions, swelling, absorption, adsorption, and the like. Broadly, one of ordinary skill would understand water absorbent substrates to become wet when water or a water solution is applied.

Often, the water-absorbent substrates are derived directly or through processing from agricultural products. For example, wood, cotton, wheat straw, hemp, grasses, bagasse, and corn have been processed to fibers or pulp for the manufacture of textiles and paper. Alternatively, water-absorbent substrates are produced from synthetic materials, for example those yarns manufactured for the production of textiles. Examples of a yarn produced from agricultural products and/or synthetic material includes acetate, acrylic, cotton, wool, nylon, and polyester spuns and blends such as polyester/cotton, polyester/wool, and polyester/rayon.

Examples of absorbent substrates includes: papers, boards, textiles, leathers, ceramics, and the like. Examples of papers include but are not limited to tissue paper, toilet paper, paper, paperboard, and cardboard. Examples of boards include but are not limited to insulation board, medium density fiberboard, hardboard, wood composition board, gypsum board, wall board, and plaster board. Textiles can be woven or nonwoven textiles made from natural and/or synthetic materials. Examples of textiles include but are not limited to carpeting, upholstery, window coverings, table coverings, bed coverings, towels, napkins, filters, flags, backpacks, tents, nets, balloons, kites, sails, parachutes, and clothing. Leathers include artificial leather and natural leather.

A nonlimiting list of natural materials that can be employed in woven or nonwoven textiles includes cotton, hemp, wool, and hair. A nonlimiting list of synthetic materials that can be included in water-absorbent woven or nonwoven textiles includes polymer filaments of polyethylene, polystyrene, polypropylene, polyester (e.g., polyethylene terephthalate), polymer blends, co-polymers, and the like.

An important aspect of the articles and methods described herein is the treatment of the substrate with a coating polymer. The coating polymer may be water-soluble, water-insoluble, or partially water-soluble and is not gelled prior to contacting the substrate. Preferably the coating polymer is soluble in water, more preferably the coating polymer forms homogeneous, non-gelled solutions in water from which uniform films can be applied on a substrate. Gellation of the coating polymer prior to contacting the substrate should be avoided and the unacceptable gelling or gellation of the polymer coating material is hereby defined as the state of the coating polymer, prior to contacting the substrate, wherein cross-linking has occurred such that the polymer acts as a solid or semi-solid and/or exhibits limited or no flow when at rest. Examples of polymer and cross-linker applications include but are not limited to spraying, coating, dip-coating, painting, printing, and the like. The coating polymer can be a single polymer, a blend of a plurality of polymers, or a blend of polymer(s) and surface treatment aids.

The herein described preferred coating polymers contain a plurality of hydroxyl groups. These polymers, often called polymer polyols or simply polyols, can be characterized by the number of hydroxyl groups on the polymer. One means for determining and reporting the number of hydroxyl groups is by the hydroxyl number of the polymer. A hydroxyl number is determined by measuring the amount in milligrams of potassium hydroxide that is needed to neutralize the acetic acid that is formed when acetic anhydride and pyridine are reacted with 1 g of the polymer. The hydroxyl number is reported in milligrams KOH per gram of polymer (mg KOH/g). This technique, well known in the art, is an easy means for determining the density of hydroxyl groups on a polyol-polymer backbone. The polymers applicable herein have hydroxyl numbers grater than about 20 mg KOH/g, preferably greater than about 50 mg KOH/g, more preferably greater than 100 mg KOH/g, and still more preferably greater than 200 mg KOH/g.

Useful polyols have a weight average molecular weight of about 500 to about 20,000,000 Dalton. One of ordinary skill in the art would understand that the weight average molecular weight of the employed polyol polymer is dependent on the chemical structure and characteristics of the polyol. For example, a poly(vinyl alcohol) polyol preferably has a weight average molecular weight of about 500 to about 10,000,000 Daltons whereas a polysaccharide polyol preferably has a weight average molecular weight of about 10,000 to about 20,000,000 Daltons.

One class of preferable polyol is poly(vinyl alcohol). PVOH, or a copolymer thereof. Poly(vinyl alcohol) is typically produced by hydrolyzing polyvinyl acetate to replace the acetate groups with alcohol groups. The number of acetate groups that are replaced are generally referenced by the percent hydrolysis. Another class of preferable polyol is polysaccharide or a copolymer thereof.

The production of PVOH yields polymers with various viscosities and degrees of hydrolysis. Viscosity is generally understood to be a function of the molecular weight of PVOH and commercial PVOHs are generally sold based on viscosity ranges not weight average molecular weights. Examples of commercially available PVOHs useful in the articles and methods described herein include but are not limited to PVOHs with the following viscosities in centipoises and degrees of hydrolysis:

Polyols

| | Viscosity | % hydrolyzed |
|---|---|---|
| Partially Hydrolyzed | | |
| MOWIOL 3-85 | 3.4-4.0 | 84.2-86.2 |
| MOWIOL 4-88 | 3.5-4.5 | 86.7-88.7 |
| MOWIOL 5-88 | 5.0-6.0 | 86.7-88.7 |
| ELVANOL 51-05 | 5.0-6.0 | 87.0-89.0 |
| MOWIOL 8-88 | 7.0-9.0 | 86.7-88.7 |
| MOWIOL 13-88 | 11.5-14.5 | 86.7-88.7 |
| MOWIOL 18-88 | 16.5-19.5 | 86.7-88.7 |
| MOWIOL 23-88 | 21.5-24.5 | 86.7-88.7 |
| ELVANOL 52-22 | 23.0-27.0 | 87.0-89.0 |
| MOWIOL 26-88 | 24.5-27.5 | 86.7-88.7 |
| MOWIOL 32-88 | 30.0-34.0 | 86.7-88.7 |
| MOWIOL 40-88 | 38.0-42.0 | 86.7-88.7 |
| MOWIOL 47-88 | 45.0-49.0 | 86.7-88.7 |
| ELVANOL 50-42 | 44.0-50.0 | 87.0-89.0 |
| MOWIOL 56-88 | 52.0-60.0 | 86.7-88.7 |
| Intermediately Hydrolyzed | | |
| ELVANOL 70-14 | 13.0-16.0 | 95.0-97.0 |
| ELVANOL 70-27 | 25.0-30.0 | 95.5-96.5 |
| ELVANOL 60-30 | 27.0-33.0 | 90.0-93.0 |
| MOWIOL 30-92 | 28.0-32.0 | 91.5-93.3 |
| Fully Hydrolyzed | | |
| MOWIOL 4-98 | 4.0-5.0 | 98.0-98.8 |
| MOWIOL 6-98 | 5.0-7.0 | 98.0-98.8 |
| ELVANOL 70-06 | 6.0-7.0 | 98.0-99.0 |
| MOWIOL 10-98 | 9.0-11.0 | 98.0-98.8 |
| MOWIOL 20-98 | 18.5-21.5 | 98.0-98.8 |
| ELVANOL 71-30 | 27.0-33.0 | 98.0-99.0 |
| MOWIOL 30-98 | 28.5-31.5 | 98.0-98.8 |
| MOWIOL 56-98 | 52.0-60.0 | 98.0-98.8 |

The MOWIOL product line is available from KURARAY AMERICA, Inc., Houston Tex.; the ELVANOL product line is available from DUPONT Co., Wilmington Del. Viscosity is measured for a 4% solids aqueous solution at 20° C., as reported by the commercial supplier.

Applicable PVOHs have a viscosity less than about 60 cP, preferably a viscosity less than about 30 cP, more preferably a viscosity less than about 15 cP, and most preferably a viscosity less than about 10 cP, when measured as a 4% PVOH by weight in aqueous solution. While the coating technology art teaches that PVOH coatings employing higher molecular weight PVOHs are preferable, the coatings and methods of making the coatings disclosed herein were found to be superior when lower molecular weight (lower viscosity) PVOHs were used.

Optionally, additional hydroxyl containing polymers may be included with the polyol polymers (separately or copolymerized with) in the herein described coatings. Examples of additional polyols include polysaccharides, oligosaccharides, and the like. Non-limiting examples of polysaccharides include glucan, glycogen, starch, cellulose, dextran, maltodextrin, fructan, mannan, chitin, and the like. Additionally, polysaccharide polymers include those polymers that are derived from sugar repeat units, including copolymers of sugar repeat units and other repeat units, and polymers and/or copolymers of repeat units derived from sugar repeat units. If applied to a paper substrate, the other hydroxyl containing polymer preferably does not produce an odor or color the paper upon the typical heating utilized in the paper making process. Additionally, the other hydroxyl containing polymers preferably are miscible with poly(vinyl alcohol) or aqueous solutions of poly(vinyl alcohol), and preferably form uniform coatings. In one embodiment, the coating polymer contains no cellulose-based polymer(s), particularly no cellulose ether or cellulose ester polymers.

The coating polymer can be a blend of a plurality of polymers wherein the plurality includes at least one polyol, preferably a water-soluble polyol. The other polymers can be hydroxyl containing polymers, fluoropolymers, polyurethanes, nylons, polycarbonates, polyalkenes, polyacrylates, polyvinylcholorides, silicones, polystyrenes, celluloses, starches, polyisoprenes, proteins, cationic polymers, co-polymers, blends, and/or derivatives thereof. Preferably, the other polymers contribute to the adhesive release properties of the articles described herein. More preferably, the other polymers are not directly detrimental to the adhesive release properties described herein.

The coating polymer can be applied from a composition that is a blend of polymer(s) and may include one or more surface treatment aids. Examples of surface treatment aids include but are not limited to waxes, wax emulsions, gels, clays, minerals, surfactants, and the like. Additional characteristics may be added to the substrate, e.g., water repellency, by the addition of, for example, other polymers or copolymers, e.g., silicones, siloxanes, stearylated melamine, calcium stearates, alkyl succinic anhydrides, alkyl ketene dimers, latex binders (i.e. styrene-butadiene co-polymers, styrene acrylonitrile butadiene co-polymers), SB-R (rubber) copolymers, poly (vinylacetate) and copolymers thereof, or the like. Surface treatment aids (alone or in combination) may be added in amounts in the range of about 0.1 wt. % to about 50 wt. % of the polyol polymer-containing composition.

Another important aspect of the present disclosure is the reaction of the coating polymer with a cross-linking agent. The cross-linking agent can be water-soluble, water-insoluble, or partially water-soluble. One of ordinary skill understands that the specific coating polymer and the specific cross-linking agent are mutually dependant. Preferably, the cross-linking agent reacts with the hydroxyl functionality of a water-soluble polyol. Examples of organic cross-linking agents include chloroformate esters; ureas; urea formaldehyde polymers; polyamides; polycarboxylates; polycarboxylic acids, e.g., di-, tri-, or tetra-carboxylate/carboxylic acid; polyisocyanates, e.g., di-, tri-, or tetra-isocyanate; polyaldehydes, e.g., di, tri-, or tetra aldehyde (e.g., glutaraldehyde); epoxides, e.g., epoxidized polyamine-polyamide resin; formaldehyde copolymers, such as urea formaldehyde polymers and melamine formaldehyde polymers; and modified melamine formaldehyde polymers (e.g., CYMEL product line available from CYTEC INDUSTRIES Inc.). Examples of inorganic cross-linking agents include borates, aluminates, silanes, silicates, phosphates (e.g., trisodium trimetaphosphate), phosphites, and phosphonates. When the coating polymer is a PVOH or copolymer thereof, the cross-linking agent is preferably a borate. The reaction of borates with PVOH is well know in the art to yield a cross-linked gel. See e.g. Casassa et al. "The Gelation of Polyvinyl Alcohol with Borax" *J. Chem. Ed.* 1986, 63, 57-60. More preferably the borate is a monoborate, a diborate, a triborate, a tetraborate, pentaborate, octaborate, or a metaborate. Even more preferably the borate is a tetraborate, e.g., sodium tetraborate, potassium tetraborate, and ammonium tetraborate. Still more preferably, the borate is borax.

Another important aspect of the present disclosure is the process for the manufacture of a release substrate. While the combinations of the herein described cross-linking agent and polymer are well known in the art, the general combination of the above described materials is known to produce a gel or other gelatinous material that has been found unsuitable for forming a permanent coating on a substrate. One benefit of the disclosed material is obtained when the substrate is first treated with the cross-linking agent via a first treatment step and is then treated with the coating polymer via a subsequent treatment step. As used herein, treating and coating are synonymous; generally a treatment refers to the process of applying a material to a substrate and a coating is the layer or material on the substrate. Preferably, the substrate is treated with the cross-linking agent and is then dried, thereby depositing the cross-linking agent on the substrate. Following the drying of the cross-linking agent-containing substrate, the coating polymer then is added to the substrate, as described in more detail hereinafter.

The method of treating the substrate in the above-described treatment steps is dependent on the nature of the substrate; a goal of the treatment steps is to provide a uniform application of the cross-linking agent and the polymer to the substrate. Examples of cross-linking agent coating units suitable for obtaining uniform cross-linking agent coatings on substrates include impregnation units, knife coating units, wire wound coating bars, roll coaters, spray coaters, size presses, nip presses, and the like. As one non-limiting example, paper can be treated with a cross-linking agent utilizing coaters, e.g., brush and air knife coaters, on-machine coaters, high speed blade coaters, light weight on-machine coaters, Gate roll coaters, double blade coaters, and those coaters presented in Fukui Terunobu, "A Review of Paper Coating. Paper Coating Technologies in the 20th Century", *Japan TAPPI Journal*, 2001, 55, 1651-1667 and Jerzy Wypych, *Polymer Modified Textile Materials* (John Wiley & Sons 1988), both of which are incorporated herein by reference. Another non-limiting example applicable to paper is the treatment of pulp with a cross-linking agent, either by the addition of the cross-linking agent to the pulper (wherein the pulper is the first coating unit) or by adding, e.g., spraying, the cross-linking agent onto the pulp on the paper-making wire. Additional non-limiting examples include spray coating, e.g., utilizing a spray arm with preferably a plurality of spray nozzles, dip coating, painting, re-wetting with cross-linker and polymer(s) at the waterbox of a papermill, and the like. Substrates other than paper may require adaptation or augmentation of the treatment methods, these adaptations or augmentations are within the knowledge of one of ordinary skill in the art.

Drying the cross-linking agent-coated substrate formed after treating the substrate with the cross-linking agent can include the application of heat, the application of vacuum, the application of both heat and vacuum, or the air drying of the substrate. Applicable methods for any particular substrate are known to those of ordinary skill in the art. As used herein, dry and drying mean that water or other solvents were removed from the substrate to the point that reapplication of water or other solvent would darken or visibly wet the substrate. Preferably, dry or drying is to about 10% by wt. to about 20% by wt. water or other solvent, but may be 0% to about 20% by wt., more preferably 0% to about 10% by wt. water.

The method of treating the cross-linking agent-coated-substrate with the coating polymer is dependent on the nature of the substrate; a goal of the treating is to provide a uniform application of the coating polymer on the substrate, preferably essentially co-extensive with the surface of the substrate contacted by the cross-linking agent. As one non-limiting example, a second coating unit can be a brush and/or air knife coater, on-machine coater, high speed blade coater, light weight on-machine coater, Gate roll coater, double blade coater, and those coaters presented in Fukui Terunobu, "A Review of Paper Coating. Paper Coating Technologies in the 20th Century", Japan TAPPI Journal, 2001, 55, 1651-1667 and Jerzy Wypych, Polymer Modified Textile Materials (John Wiley & Sons 1988), both of which incorporated herein by reference. Additional non-limiting examples of methods include spray coating, e.g., utilizing a spray arm with preferably a plurality of spray nozzles, dip coating, painting, and the like. Substrates other than paper may require adaptation or augmentation of the treatment methods, these adaptations or augmentations are within the knowledge of one of ordinary skill in the art. Preferably, the substrate is treated with the coating polymer and is then dried. In the manufacture of the release papers described herein, as well as the grease-resistant papers described in the parent application, the drying preferably includes heating the paper to a drying temperature, preferably, less than about 300° F., more preferably less than about 212° F., even more preferably less than about 150° F., and still more preferably less than about 125° F., at 1 atmosphere.

Without being bound to theory, the process for the manufacture of the adhesion-resistant (release) substrates described herein is believed to benefit from both the individual treatment of fibers in fibrous substrates and the formation of cross-linked density gradients. First, the individual treatment of fibers in a fibrous substrate, e.g. paper, is believed to be effectuated by the multi-step treatment process described above. The individual fibers are believed to be first coated with the cross-linking agent and then coated with the polyol polymer. This subsequent treatment of the substrate with the polymer is believed to allow the polymer to individually coat the fibers as opposed to coat the surface of the substrate (leaving voids in a roughened substrate surface). Furthermore, the herein described process is believed to yield a polyol-polymer coating wherein a percentage of polymer cross-linking is higher at the substrate/polymer interface and lower at a polymer surface furthest away from the substrate surface. The process is additionally believed to yield a cross-link density gradient in between the substrate interface and the face polymer surface. Moreover, it is believed that the process described herein significantly enhances both the mechanical and chemical bonding of the polyol-polymer coating to the substrate.

Physical characteristics of the adhesion-resistant substrates described herein can be modified by changing the amount of coating polymer added to the substrate and by changing the coating polymer/cross-linking agent ratio. Preferably, the amount of the coating polymer added to the substrate is sufficient to provide adhesion resistance. More preferably, the amount of coating polymer applied to the substrate, and cross-linked in situ, as disclosed herein, is less then the amount of coating polymer necessary in the silicone release coating art to provide the same adhesive release. Even more preferably, the amount of coating polymer utilized in the present disclosure is less than 75% of the amount of coating polymer necessary in the art, still more preferably, the amount of coating polymer utilized in the present disclosure is less than 50% of the amount of coating polymer necessary in the art. The amount of polymer added is preferably about 1 to about 200 pounds per ton of substrate, more preferably about 5 to about 150 pounds per ton of substrate, even more preferably about 10 to about 100 pounds per ton of substrate, still more preferably about 10 to about 50 pounds per ton of substrate. One of ordinary skill in the art would recognize that wherein a sheet of 20 pound basis weight paper may need 50 pounds polymer per ton of paper, a sheet of 40 pound basis weight paper may only need about 25 pounds polymer per ton of paper and a sheet of 80 pounds basis weight paper may only need about 12 pounds polymer per ton of paper.

Likewise, the ratio of the coating polymer to cross-linking agent is sufficient to provide adhesive release to the substrate.

The benefits of substantial adhesive release, as described herein, are achieved when the ratio of polymer to cross-linking agent is low, relative to prior art polymer-cross linking agent compositions. Preferably, the mass ratio of the polymer to cross-linking agent is less than about 10:1. More preferably the mass ratio is less than about 5:1, and even more preferably the mass ratio is less than or equal to about 3:1.

Corresponding to the above presented preferred ratio of polymer to cross-linking agent, the preferred amount of cross-linking agent added to the substrate is about 0.1 to about 400 pounds per ton of substrate, more preferably about 1 to about 200 pounds per ton of substrate, most preferably about 5 to about 50 pounds per ton of substrate.

In one preferred embodiment where the polymer is a polyol and the cross-linking agent is borax, the preferred mass ratio of polyol to cross-linking agent is in a range of about 1:10 to about 10:1, more preferably about 1:1 to about 8:1, even more preferably about 2:1 to about 7:1, still more preferably about 3:1 to about 6:1.

When the substrate is paper, the coating is preferably applied during the paper making process. The treatment of the paper with the cross-linking agent, preferably borax, can be accomplished by any of the methods outlined above. Preferably, the borax is added as a water based solution to the paper.

Referring to FIG. 1, the addition of the cross-linking agent to paper fibers can occur at one or more places on a paper machine 100. For example, this fiber treatment can be carried out by spraying the cross-linking agent or a solution thereof onto the paper fibers at one or more locations 110-112 in the forming section 102 of the paper machine 100 and/or at a location 113 within or at a location 114 after the press section 103 and before the dryer sections 104-105 and/or at a location 115 after a first dryer section 104 but before a second dryer section 105. The location where the coating polymer is added to the paper fibers in dependent on the location of the addition of the cross-linking agent. In one non-limiting example, the cross-linking agent can be applied at a location 114 after the press section 103 and before the first dryer section 104. The coating polymer could then be added at a location 115 after the first dryer section 104 and before the section dryer section 105. Other possibilities include the addition of the cross-linking agent at a location before the headbox 101, in the flow line from the pulper to the headbox 101, or directly to the pulper. Still other possibilities include the addition of the cross-linking agent and the coating polymer to the substrate or the coating polymer to the cross-linking agent treated substrate at the waterbox of a papermill, or off of the paper making line, for example through the use of an off-line coater well.

Once the adhesion-resistant substrate has been prepared, the substrate can be employed as either a release substrate (liner) or as an adhesive backed article (a "sheet"), e.g., a pressure sensitive adhesive tape. One of ordinary skill in the art would recognize that the terms adhesive backed article and adhesive coated article are, herein, interchangeable, while adhesive backed is typically used to describe the article and adhesive coated is typically used to describe the adhesive function. As a release sheet, the adhesion-resistant substrate and an adhesive backed article form a laminate. As a pressure sensitive adhesive tape, the adhesion-resistant substrate is combined with an adhesive to form a sheet.

Multiple techniques for manufacturing laminates are available. In one example, the adhesive is applied to the adhesion-resistant side of the absorbent substrate and then an article, e.g., paper, is applied to the adhesive. In a second example, the adhesive is first applied to at least one major surface of an article and then the adhesive-coated surface of the article is applied to the adhesion resistant side of the absorbent substrate.

Figure 2:
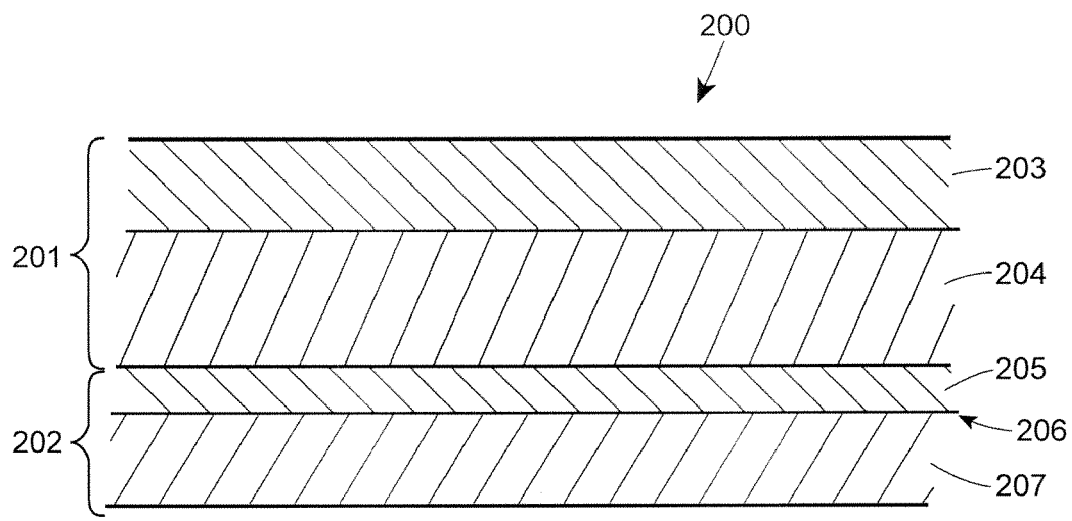
FIG. 2 is a drawing of a laminate composed of an adhesive-backed article and an release substrate.

Referring to FIG. 2, the laminate 200 is constructed of at least two distinct layers, the adhesive backed article 201 and the release substrate 202, which are individually composed of multiple components. The adhesive backed article 201 comprises an article 203 and an adhesive 204. The article 203 can be the same material as the absorbent substrate 207, as described above, or can be a non-absorbent material, e.g., polystyrene films, polyethylene films, metal sheets, foils, or films, and the like. The article 203 can be print receptive, that is the article 203 is capable of receiving printing from, for example, an ink transfer unit, an inkjet printer, a laser printer, thermal printer, and the like. Alternatively, the article 203 can additionally comprise one or more print receptive layers. Still further, the article 203 can exhibit or comprise additional functional layers that exhibit properties such as magnetic, electromagnetic, thermochromic, piezoelectric, semiconducting, and the like. The release substrate 202 is composed of an adhesion-resistant coating 205 adhered or coated on an adhesion-resistant side 206 of the absorbent substrate 207. Depending on the thickness of the adhesion-resistant coating 205, the coating may or may not appear as a distinct layer supported on the adhesion-resistant side of the absorbent substrate 207. Moreover, the laminate can comprise an article with adhesive coatings on a plurality of major surfaces, e.g., double sided tape, wherein the plurality of major adhesive surfaces are in contact with one or more adhesion-resistant substrates (not shown).

Figure 3:
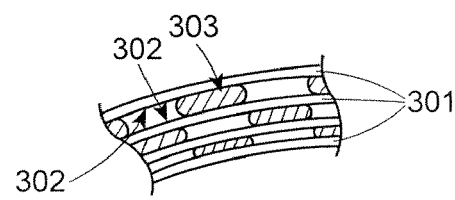
FIG. 3 is a drawing of a laminate composed of a release substrate that individually has two adhesion resistant sides and adhesive "dots."

Referring to FIG. 3, a laminate can comprise an adhesive 303 in the absence of an article, e.g., the pressure sensitive adhesive disks described in U.S. Pat. No. 6,319,442, incorporated herein by reference. Therein the adhesive is supported between a plurality of release substrates 301. As shown the release substrates 301 can comprise adhesion-resistant coatings 302 on a plurality of major surfaces. Alternatively, the release substrates 301 can comprise an adhesion-resistant coating 302 on only one major surface wherein the laminate would comprise a single layer of adhesive disks, see e.g., FIG. 5.

Similarly, multiple techniques are available for the manufacture of sheets. In one example, the adhesive is applied to the adhesion-resistant side of the absorbent substrate and, optionally, the substrate is wound so the adhesive contacts a side of the absorbent substrate that is opposite that of the adhesion-resistant side. In another example, the adhesive is applied to the adhesion-resistant side of the absorbent substrate and then a side of a second substrate comprising a second adhesion-resistant side is applied to the adhesive so the adhesive contacts the side of the second absorbent substrate that is opposite that of the second adhesion-resistant side. In still another example, the adhesive is directly applied to the side of the substrate opposite that of the adhesion-resistant side.

Figure 4:
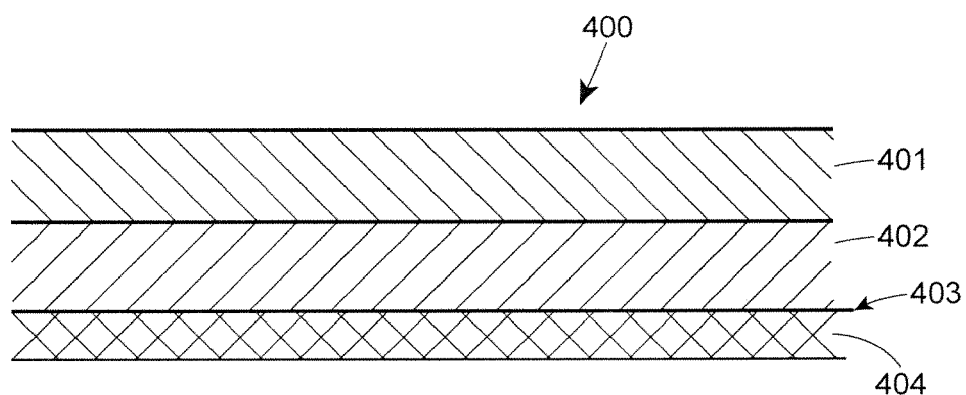
FIG. 4 is a drawing of a sheet having an adhesive-coated side and an adhesion-resistant side.

Referring to FIG. 4, the sheet 400 comprises an adhesive 401 in contact with a major surface of an absorbent substrate 402, e.g., those described above, that is opposite to the adhesion-resistant side 403 of the absorbent substrate 402. The adhesion-resistant side 403 is the major surface of the absorbent substrate where the adhesion-resistant coating 404 was applied, as described above.

Figure 5:
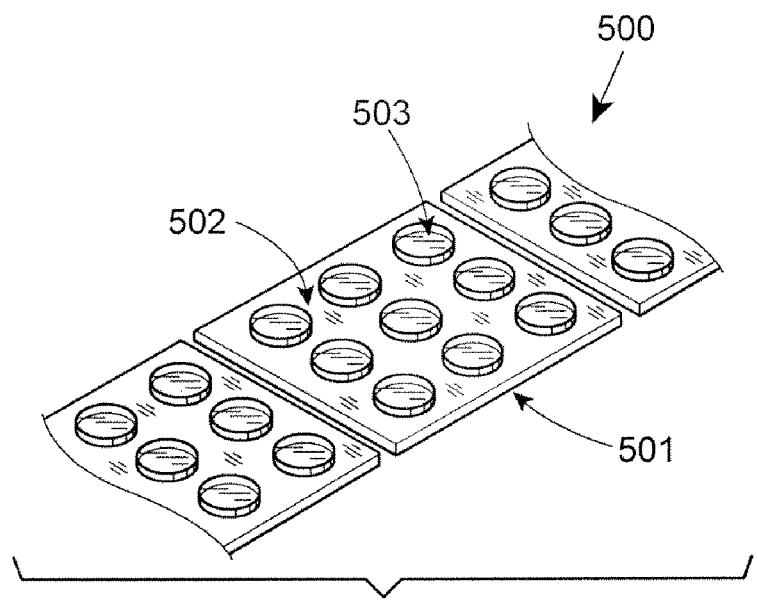
FIG. 5 is a drawing of a sheet having adhesive "dots" and a substrate with an adhesion resistant side.

Referring to FIG. 5, the sheet 500 is illustrated with pressure sensitive adhesive disks 503 in contact with an adhesion-resistant (release) substrate 501. Therein, the adhesive is supported on or weakly adhered to the major surface of the release substrate 501 treated with an adhesion-resistant coating 502.

Figure 6:
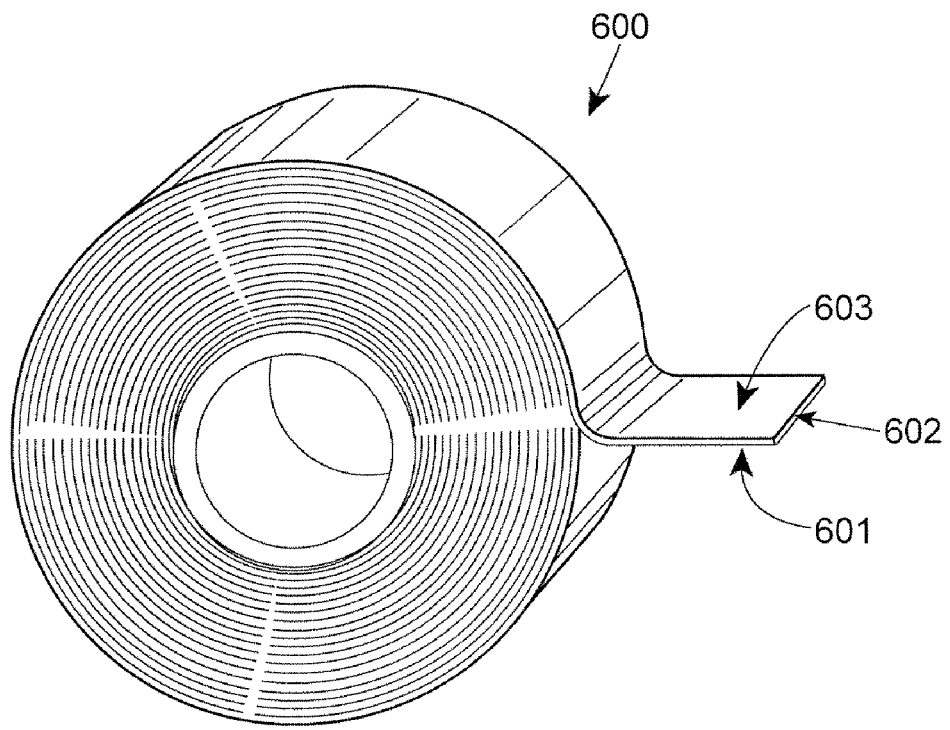
FIG. 6 is a drawing of wound sheet having an adhesive-coated side and an adhesion-resistant side.

Referring to FIG. 6, the sheet is illustrated as a wound tape 600. The single-sided adhesive tape shown comprises an adsorbent substrate 602 where the adhesive 601 and the adhesive resistant side 603 positioned such that the adhesive 601 contacts the adhesive resistant side 603 when the tape 600 is wound. Furthermore, the adhesive resistant side 603 is preferably on an outer surface when the tape is wound, thereby, preventing the wound tape from adhering to other objects. An alternative embodiment is a double sided tape comprising a laminate constructed from an article with adhesive on both sides and a substrate with both sides being adhesion-resistant.

EXAMPLES

The following examples are provided to illustrate the invention, but are not intended to limit the scope thereof. Example 1 are samples of articles treated by the above described methods for adhesion resistance. Example 2 are samples of articles coated by the above described methods, wherein the coating polymer is a blend of a poly(vinyl alcohol) and another polymer. Example 3 are results of a comparative release test, where a plurality of known coating agents were compared to a herein described adhesion resistant substrate. Comparative samples are included in both Example 1 and Example 2 wherein the cross-linking agent was omitted from the method.

The general procedure was followed for all of the samples produced, recognizing that comparative examples omit the borax treatment step. Generally: a 8 inch by 11 inch sheet of uncoated 20 pound paper was dried at 105° C. for 2 minutes in a speedy drier, then coated with an aqueous cross-linker, e.g., borax solution using a #1.5 Mayer Rod, providing a 0.0015 inch (3.8 µm) thick coat of the solution (approximate coverage 10,700 ft$^2$/gal (263 m$^2$/l) and a wet film weight of 0.94 lbs/1000 ft$^2$ (3.8 g/m$^2$)). The paper was then dried for 2 minutes at 105° C. Next, the paper was coated with an aqueous coating polymer solution using a #1.5 Mayer Rod and then the paper was dried for 2 minutes at 105° C.

Significant variability was observed in the adsorption of the paper after the treatment of the paper with the cross-linker solution. Without being bound to any particular theory, it is believed that these variabilities are due in part to the wicking properties of the paper after borax addition and to the rapid reaction of the polyol with the borax. The reported values for pounds of borax per ton of paper were calculated by weighing the paper after the first drying, coating the sheet and drying the sheet, and then re-weighing and measuring the area coated. This provides a measure of the grams of coating per square centimeter, that value is then converted to pounds per ton of paper. The reported values for pounds of polymer per ton of paper were calculated in the same way.

The provided examples employ polyols of varying viscosity and hydrolyzation. The series tested and reported herein are the ELVANOL brand of polyvinyl alcohols available from DUPONT Co., Wilmington Del. Table 3 lists the general characteristics of this series of ELVANOL polymers.

TABLE 3

| Representative Polyols[1] | % hydrolyzed | Viscosity (cP)[2] |
|---|---|---|
| ELVANOL 51-05 | 87-89 | 5-6 |
| ELVANOL 52-22 | 87-89 | 23-27 |
| ELVANOL 50-42 | 87-89 | 44-50 |

TABLE 3-continued

| Representative Polyols[1] | % hydrolyzed | Viscosity (cP)[2] |
|---|---|---|
| ELVANOL 70-06 | 98-99 | 6-7 |
| ELVANOL 71-30 | 98-99% | 27-33 |

[1]ELVANOL polyols are hydrolyzed polyvinyl alcohols (PVOH) available from DUPONT Co., Wilmington DE.
[2]4% solids aqueous solution at 20° C.

Example 1

Samples 1-5 presented in Table 4 provide representative test data of adhesion resistance for coatings of the polyols used throughout Example 1. These samples were prepared by the general method, above, where the coating of the paper with borax was omitted. The aqueous coating polymer solution was a 7.5 wt. % solution of the polyol in water. The weight of polymer(s) and borax in the following tables are calculated on a dry polymer and dry borax basis.

TABLE 4

| | Polyol | Lbs. Polyol per Ton of paper | Lbs Borax per Ton of paper | Polyol coat weight g/m$^2$ |
|---|---|---|---|---|
| 0 | none | 0 | 0 | 0 |
| 1 | ELVANOL 51-05 | 68.7 | 0 | 1.075 |
| 2 | ELVANOL 52-22 | 107 | 0 | 1.743 |
| 3 | ELVANOL 50-42 | 66 | 0 | 1.108 |
| 4 | ELVANOL 70-06 | 46 | 0 | 0.766 |
| 5 | ELVANOL 71-30 | 51.7 | 0 | 0.863 |

Samples 6-10 presented in Table 5 provide test data for paper first treated with an aqueous 2.5 wt. % borax solution and then an aqueous 7.5 wt. % coating polymer solution. The application ratio of polymer to cross-linking agent was 3:1.

TABLE 5

| | Polyol | Lbs. Polyol per Ton of paper | Lbs Borax per Ton of paper | Polyol coat weight g/m$^2$ |
|---|---|---|---|---|
| 6 | ELVANOL 51-05 | 52.4 | 7.5 | 0.880 |
| 7 | ELVANOL 52-22 | 52.7 | 19.8 | 0.880 |
| 8 | ELVANOL 50-42 | 104.5 | 33.8 | 1.694 |
| 9 | ELVANOL 70-06 | 71.9 | 6.5 | 1.205 |
| 10 | ELVANOL 71-30 | 66.6 | 6.6 | 1.108 |

Samples 11-15 presented in Table 6 provide test data for paper first treated with an aqueous 5 wt. % borax solution and then an aqueous 7.5 wt. % coating polymer solution. The application ratio of polymer to cross-linking agent was 1.5:1.

TABLE 6

| | Polyol | Lbs. Polyol per Ton of paper | Lbs Borax per Ton of paper | Polyol coat weight g/m$^2$ |
|---|---|---|---|---|
| 11 | ELVANOL 51-05 | 88.7 | 22.2 | 1.482 |
| 12 | ELVANOL 52-22 | 59.6 | 39.7 | 1.091 |
| 13 | ELVANOL 50-42 | 86.6 | 26.7 | 1.450 |
| 14 | ELVANOL 70-06 | 78.5 | 26.2 | 1.303 |
| 15 | ELVANOL 71-30 | 99.9 | 33.3 | 1.661 |

Samples 16-20 presented in Table 7 provide test data for paper first treated with an aqueous 7.5 wt. % borax solution and then an aqueous 7.5 wt. % coating polymer solution. The application ratio of polymer to cross-linking agent was 1:1.

The higher concentration of borax required the addition of about 2.5 wt. % to about 7.5 wt. % of glycerol to the aqueous borax solution prior to coating.

TABLE 7

| | Polyol | Lbs. Polyol per Ton of paper | Lbs Borax per Ton of paper | Polyol coat weight g/m² |
|---|---|---|---|---|
| 16 | ELVANOL 51-05 | 67.4 | 37.4 | 1.124 |
| 17 | ELVANOL 52-22 | 93.3 | 93.3 | 1.564 |
| 18 | ELVANOL 50-42 | 162 | 47.5 | 2.704 |
| 19 | ELVANOL 70-06 | 84.2 | 83.9 | 1.401 |
| 20 | ELVANOL 71-30 | 100.2 | 66.9 | 1.661 |

Samples 21-25 presented in Table 8 provide test data for paper first treated with an aqueous 2.5 wt. % borax solution and then an aqueous 5 wt. % coating polymer solution. The application ratio of polymer to cross-linking agent was 2:1.

TABLE 8

| | Polyol | Lbs. Polyol per Ton of paper | Lbs Borax per Ton of paper | Polyol coat weight g/m² |
|---|---|---|---|---|
| 21 | ELVANOL 51-05 | 47.2 | 6.7 | 0.782 |
| 22 | ELVANOL 52-22 | 39.7 | 26.5 | 0.668 |
| 23 | ELVANOL 50-42 | 46.4 | 26.5 | 0.782 |
| 24 | ELVANOL 70-06 | 68.8 | 13.8 | 1.157 |
| 25 | ELVANOL 71-30 | 53.1 | 19.9 | 0.880 |

Samples 26-30 presented in Table 9 provide test data for paper first treated with an aqueous 5 wt. % borax solution and then an aqueous 5 wt. % coating polymer solution. The application ratio of polymer to cross-linking agent was 1:1.

TABLE 9

| | Polyol | Lbs. Polyol per Ton of paper | Lbs Borax per Ton of paper | Polyol coat weight g/m² |
|---|---|---|---|---|
| 26 | ELVANOL 51-05 | 66.5 | 22.2 | 1.108 |
| 27 | ELVANOL 52-22 | 39.7 | 33.1 | 0.668 |
| 28 | ELVANOL 50-42 | 60.7 | 33.8 | 1.010 |
| 29 | ELVANOL 70-06 | 52.3 | 32.6 | 0.880 |
| 30 | ELVANOL 71-30 | 27 | 26.6 | 0.440 |

Samples 31-35 presented in Table 10 provide test data for paper first treated with an aqueous 7.5 wt. % borax solution and then an aqueous 5 wt. % coating polymer solution. The application ratio of polymer to cross-linking agent was 0.66:1. The higher concentration of borax required the addition of about 2.5 wt. % to about 7.5 wt. % of glycerol to the aqueous borax solution prior to coating.

TABLE 10

| | Polyol | Lbs. Polyol per Ton of paper | Lbs Borax per Ton of paper | Polyol coat weight g/m² |
|---|---|---|---|---|
| 31 | ELVANOL 51-05 | 52.4 | 44.9 | 0.880 |
| 32 | ELVANOL 52-22 | 73.5 | 100 | 1.222 |
| 33 | ELVANOL 50-42 | 88.8 | 40.9 | 1.482 |
| 34 | ELVANOL 70-06 | 65.4 | 58.8 | 1.091 |
| 35 | ELVANOL 71-30 | 88.6 | 67 | 1.450 |

Samples 36-40 presented in Table 11 provide test data for paper first treated with an aqueous 2.5 wt. % borax solution and then an aqueous 2.5 wt. % coating polymer solution. The application ratio of polymer to cross-linking agent was 1:1.

TABLE 11

| | Polyol | Lbs. Polyol per Ton of paper | Lbs Borax per Ton of paper | Polyol coat weight g/m² |
|---|---|---|---|---|
| 36 | ELVANOL 51-05 | 44.4 | 7.4 | 0.733 |
| 37 | ELVANOL 52-22 | 40.2 | 26.8 | 0.668 |
| 38 | ELVANOL 50-42 | 13.3 | 13.4 | 0.228 |
| 39 | ELVANOL 70-06 | 33.0 | 6.6 | 0.554 |
| 40 | ELVANOL 71-30 | 13.5 | 13.5 | 0.228 |

Samples 41-45 presented in Table 12 provide test data for paper first treated with an aqueous 5 wt. % borax solution and then an aqueous 2.5 wt. % coating polymer solution. The application ratio of polymer to cross-linking agent was 0.5:1.

TABLE 12

| | Polyol | Lbs. Polyol per Ton of paper | Lbs Borax per Ton of paper | Polyol coat weight g/m² |
|---|---|---|---|---|
| 41 | ELVANOL 51-05 | 15.0 | 23.3 | 0.244 |
| 42 | ELVANOL 52-22 | 46.4 | 33.1 | 0.782 |
| 43 | ELVANOL 50-42 | 21.1 | 40.4 | 0.326 |
| 44 | ELVANOL 70-06 | 71.9 | 32.6 | 1.205 |
| 45 | ELVANOL 71-30 | 33.8 | 27.0 | 0.570 |

Samples 46-50 presented in Table 13 provide test data for paper first treated with an aqueous 7.5 wt. % borax solution and then an aqueous 2.5 wt. % coating polymer solution. The application ratio of polymer to cross-linking agent was 0.33:1. The higher concentration of borax required the addition of about 2.5 wt. % to about 7.5 wt. % of glycerol to the aqueous borax solution prior to coating.

TABLE 13

| | Polyol | Lbs. Polyol per Ton of paper | Lbs Borax per Ton of paper | Polyol coat weight g/m² |
|---|---|---|---|---|
| 46 | ELVANOL 51-05 | 29.7 | 51.9 | 0.489 |
| 47 | ELVANOL 52-22 | 33.3 | 53.3 | 0.554 |
| 48 | ELVANOL 50-42 | 33.7 | 40.5 | 0.570 |
| 49 | ELVANOL 70-06 | 26.0 | 45.8 | 0.440 |
| 50 | ELVANOL 71-30 | 33.1 | 59.6 | 0.554 |

Example 2

Samples presented in Example 2 were prepared from blends of polymers. These polymer blends were dissolved to provide a 5 wt. % polymer blend solution in water and then applied as provided in the General Procedure. Example 2 includes comparative samples, i.e., without cross-linking agent, and samples wherein the cross-linking agent was applied as provided in the General Procedure. The cross-linking agent shown in these samples was borax and was provided as a 5 wt. % borax solution in water.

In Table 14, Samples 51, 53, and 55 are comparative samples wherein the borax was omitted. Sample 52 shows the effect of borax on a sample employing ethylated starch available from PENFORD PRODUCTS Co., Cedar Rapids Iowa. Sample 54 is previously presented Sample 26. Sample 56 shows the effect of including ethylated starch in the coating polymer.

TABLE 14

|    | Coating Polymer | Lbs. Coating Polymer per Ton of paper | Lbs Borax per Ton of paper |
|----|-----------------|----------------------------------------|----------------------------|
| 51 | Ethylated Starch | 89.13 | 0.00 |
| 52 | Ethylated Starch | 40.95 | 27.30 |
| 53 | ELVANOL 51-05 | 68.56 | 0.00 |
| 54 | ELVANOL 51-05 | 66.50 | 22.20 |
| 55 | 75/25 (51-05)/ES[1] | 81.71 | 0.00 |
| 56 | 75/25 (51-05)/ES[1] | 41.16 | 20.58 |

[1]Coating Polymers were a mixture of 75 wt. % ELVANOL 51-05 and 25 wt. % Ethylated Starch.

In Table 15, Samples 57, 59, 61, and 63 are comparative samples wherein the borax was omitted. Sample 58 shows the effect of borax on a sample employing Methyl Cellulose available from DOW WOLFF CELLULOSICS, Bound Brook N.J. Sample 60 is previously presented Sample 26. Samples 62 and 64 show the effects of including methyl cellulose in the coating polymer.

TABLE 15

|    | Coating Polymer | Lbs. Coating Polymer per Ton of paper | Lbs Borax per Ton of paper |
|----|-----------------|----------------------------------------|----------------------------|
| 57 | Methyl cellulose | 47.43 | 0.00 |
| 58 | Methyl cellulose | 20.60 | 41.21 |
| 59 | ELVANOL 51-05 | 68.56 | 0.00 |
| 60 | ELVANOL 51-05 | 66.50 | 22.2 |
| 61 | 75/25 51-05/MC[1] | 67.67 | 0.00 |
| 62 | 75/25 51-05/MC[1] | 54.71 | 27.35 |
| 63 | 50/50 51-05/MC[2] | 67.38 | 0.00 |
| 64 | 50/50 51-05/MC[2] | 41.18 | 41.18 |

[1]Coating Polymers were a mixture of 75 wt % ELVANOL 51-05 and 25 wt. % Methyl Cellulose.
[2]Coating Polymers were a mixture of 50 wt. % ELVANOL 51-05 and 50 wt. % Methyl Cellulose.

In Table 16, Samples 65, 67, 69, and 71 are comparative samples wherein the borax was omitted. Sample 66 shows the effect of borax on a sample employing Hydroxy Propyl Methyl Cellulose (HMPC) available from DOW WOLFF CELLULOSICS. Sample 68 is previously presented Sample 26. Samples 70 and 72 show the effects of including HMPC in the coating polymer.

TABLE 16

|    | Coating Polymer | Lbs. Coating Polymer per Ton of paper | Lbs Borax per Ton of paper |
|----|-----------------|----------------------------------------|----------------------------|
| 65 | HMPC[1] | 60.68 | 0.00 |
| 66 | HMPC[1] | 36.17 | 28.94 |
| 67 | ELVANOL 51-05 | 68.56 | 0.00 |
| 68 | ELVANOL 51-05 | 66.50 | 22.20 |
| 69 | 75/25 51-05/HPMC[2] | 67.05 | 0.00 |
| 70 | 75/25 51-05/HPMC[2] | 79.07 | 21.57 |
| 71 | 50/50 51-05/HPMC[3] | 76.73 | 0.00 |
| 72 | 50/50 51-05/HPMC[3] | 86.26 | 21.57 |

[1]Hydroxyl Propyl Methyl Cellulose (HPMC)
[2]Coating Polymers were a mixture of 75 wt. % ELVANOL 51-05 and 25 wt. % HPMC.
[3]Coating Polymers were a mixture of 50 wt. % ELVANOL 51-05 and 50 wt. % HPMC.

In Table 17, Samples 73, 75, and 77 are comparative examples wherein the borax was omitted. Samples 74, 76, and 78 show the effect of borax on the mixed polymer, coating polymer. In these three samples significant improvement in the adhesion resistance was observed by the stepwise treatment as provided in the general procedure.

TABLE 17

|    | Coating Polymers | Lbs. Coating Polymers per Ton of paper | Lbs Borax per Ton of paper |
|----|------------------|-----------------------------------------|----------------------------|
| 73 | 75/25 51-05/pVDC[1] | 60.315 | 0.0000 |
| 74 | 75/25 51-05/pVDC[1] | 68.002 | 27.2006 |
| 75 | 75/25 51-05/Cwax-PE[2] | 66.368 | 0.0000 |
| 76 | 75/25 51-05/Cwax-PE[2] | 67.337 | 26.9349 |
| 77 | 75/25 51-05/pEAA[3] | 33.085 | 0.0000 |
| 78 | 75/25 51-05/pEAA[3] | 20.289 | 27.0517 |

[1]Coating Polymers were a mixture of 75 wt. % ELVANOL 51-05 and 25 wt. % Polyvinylidene chloride.
[2]Coating Polymers were a mixture of 75 wt. % ELVANOL 51-05 and 25 wt. % carnauba wax/polyethylene wax emulsion.
[3]Coating Polymers were a mixture of 75 wt. % ELVANOL 51-05 and 25 wt. % polyethylene-acrylic acid copolymer.

Table 18 shows the effect of different borates on the adhesion-resistance of a coated sheet of paper. The paper was first treated with a borate solution and then treated with either a 2.5 wt. %, 5 wt. % or 7.5 wt. % solution of ELVANOL 70-06. In these samples the relative effects of the borate source can be observed. Samples without borate were provided for reference.

TABLE 18

|  | Cross-linking Agent | Lbs. Coating per Ton of paper | Lbs Borate per Ton of paper | wt. % borate solution |
|---|---|---|---|---|
|  | 2.5 wt. % coating polymer | 33 | 0 | 0 |
| 79 | Sodium Borate | 33 | 6.6 | 2.5 |
| 80 |  | 71.9 | 32.6 | 5 |
| 81 |  | 26 | 45.8 | 7.5 |
| 82 | Potassium Borate | 32.2 | 19.4 | 2.5 |
| 83 |  | 39 | 26 | 5 |
| 84 |  | 39 | 26 | 7.5 |
| 85 | Ammonium Borate | 26.8 | 6.7 | 2.5 |
| 86 |  | 6.7 | 67 | 5 |
| 87 |  | 33.5 | 40.2 | 7.5 |
|  | 5 wt. % coating polymer | 45.2 | 0 | 0 |
| 88 | Sodium Borate | 68.8 | 13.8 | 2.5 |
| 89 |  | 52.3 | 32.6 | 5 |
| 90 |  | 65.4 | 58.8 | 7.5 |
| 91 | Potassium Borate | 90 | 19.4 | 2.5 |
| 92 |  | 70.3 | 25.6 | 5 |
| 93 |  | 84.2 | 51.8 | 7.5 |
| 94 | Ammonium Borate | 20.1 | 26.8 | 2.5 |
| 95 |  | 47.05 | 20.15 | 5 |
| 96 |  | 73.1 | 46.5 | 7.5 |
|  | 7.5 wt. % coating polymer | 46 | 0 | 0 |
| 97 | Sodium Borate | 71.9 | 6.5 | 2.5 |
| 98 |  | 78.5 | 26.2 | 5 |
| 99 |  | 84.2 | 83.9 | 7.5 |
| 100 | Potassium Borate | 78.4 | 6.5 | 2.5 |
| 101 |  | 51.6 | 32.3 | 5 |
| 102 |  | 102.4 | 83.1 | 7.5 |
| 103 | Ammonium Borate | 80.4 | 6.7 | 2.5 |
| 104 |  | 66.7 | 20.03 | 5 |
| 105 |  | 109.5 | 47.9 | 7.5 |

Example 3

The qualitative release properties of multiple prior art coatings were compared against a coating corresponding to the present disclosure. The coatings were prepared by the general procedure of coating office inkjet paper (hammermill) with a 5% solution of the release agent/coating then using an automatic drawdown machine with Mayer Rod # 1.5; and drying the coated paper for 2 minutes at 80° C. on a speedy dryer. Then an Avery label was pulled from silicone backing and placed on the coated sheet for 60-72 hours. The label was then pulled from the paper. The qualitative results are presented in Table 19.

TABLE 19

| Trade Name | Chemistry | Observation |
| --- | --- | --- |
| MOWIOL 5-88 | PVOH | label/paper tore |
| PolySize 47[1] | paraffin emulsion | label/paper tore |
| PolySize 1597[1] | paraffin emulsion | label/paper tore |
| PolySize 12[1] | paraffin/PVOH emulsion | label/paper tore |
| Norane OC[2] | paraffin emulsion | label/paper tore |
| Sequapel 417[2] | paraffin emulsion | label/paper tore |
| PEN1031[3] | Carnauba wax emulsion | label/paper tore |
| Emulsion A25[3] | polyethylene emulsion | label/paper tore |
| Sequapel 409[2] | alkylamine emulsion | label/paper tore |
| Surfene 2060[4] | polyvinylidene chloride | label/paper tore |
| Disperison WEA-25A[3] | ethylene-acrylic acid emulsion | label/paper tore |
| Sequabond VS 9056[2] | vinyl acrylic polymer | label/paper tore |
| 5% borax/5% MOWIOL 5-88 | Herein disclosed | tight release no tear |

[1]available from POLYMER VENTURES, Inc., Charleston, SC.
[2]available from OMNOVA SOLUTIONS, Fairlawn, OH.
[3]available from CHEMCOR, Chester NY.
[4]available from ROHM AND HAAS, Philadelphia, PA.

The foregoing description is given for clearness of understanding only, and no unnecessary limitations should be understood therefrom, as modifications within the scope of the invention may be apparent to those having ordinary skill in the art.

What is claimed is:

1. A laminate comprising: a first layer comprising a release substrate having an adhesion-resistant portion formed by contacting at least a portion of an absorbent substrate with a borate cross-linking agent and then contacting the cross-linking agent-contacted portion of the absorbent substrate with a polyol polymer that is cross-linked by the cross-linking agent, in an amount sufficient to provide adhesion resistance to the contacted portion of the absorbent substrate, wherein a mass ratio of polyol to borate is in the range of about 1:10 to about 10:1, and the adhesion-resistant portion consists of a cross-linked polyol polymer in an amount of about 1 to about 200 pounds per ton of substrate having a cross-link density gradient wherein a percentage of polymer cross-linking is higher at the absorbent substrate than at a polymer surface furthest from the absorbent substrate; and a second layer comprising an adjacent article having an adhesive in contact with the adhesion-resistant portion of the release substrate.

2. The laminate of claim 1, wherein the second layer has an adhesive applied thereto prior to contacting the first layer.

3. The laminate of claim 1, wherein the second layer had no adhesive applied thereto until it is contacted with the first layer.

4. The laminate of claim 1, wherein the borate cross-linking agent is a tetraborate selected from the group consisting of sodium tetraborate, potassium tetraborate, ammonium tetraborate, and a mixture thereof.

5. The laminate of claim 1, wherein the second layer is print receptive.

6. A sheet material comprising an absorbent substrate that has a portion of a first major surface coated with an adhesion-resistant coating in an amount of about 1 to about 200 pounds per ton of substrate formed by contacting at least a portion of the first major surface with a borate cross-linking agent then contacting the borate cross-linking agent-contacted portion with a polyol polymer, in an amount sufficient to provide adhesion resistance to the contacted portion of the absorbent substrate, and the adhesion-resistant coating consists of a cross-linked polyol polymer having a cross-link density gradient wherein a percentage of polyol polymer cross-linking is higher at the absorbent substrate than at a polyol polymer surface furthest from the absorbent substrate; and at least a portion of a second major surface is coated with an adhesive, and wherein a mass ratio of polyol polymer to borate cross-linking agent is in the range of about 1:10 to about 10:1.

7. The sheet material of claim 6, wherein the borate cross-linking agent is a tetraborate selected from the group consisting of sodium tetraborate, potassium tetraborate, ammonium tetraborate, and mixtures thereof.

8. The sheet material of claim 6, wherein the first major surface of the absorbent substrate is print receptive.

9. The laminate of claim 1, wherein the mass ratio of polyol polymer to borate cross-linking agent is in the range of about 1:1 to about 8:1.

10. The laminate of claim 9, wherein the mass ratio of polyol to borate is in the range of about 1:1 to about 5:1.

11. The laminate of claim 1, wherein the mass ratio of polyol to borate is in the range of about 2:1 to about 7:1.

12. The laminate of claim 11, wherein the mass ratio of polyol to borate is in the range of about 3:1 to about 6:1.

13. The laminate of claim 1, wherein the mass ratio of polyol to borate is less than or equal to about 3:1.

14. The sheet material of claim 6, wherein the mass ratio of polyol to borate is in the range of about 1:1 to about 8:1.

15. The sheet material of claim 14, wherein the mass ratio of polyol to borate is in the range of about 1:1 to about 5:1.

16. The sheet material of claim 6, wherein the mass ratio of polyol to borate is in the range of about 2:1 to about 7:1.

17. The sheet material of claim 16, wherein the mass ratio of polyol to borate is in the range of about 3:1 to about 6:1.

18. The sheet material of claim 6, wherein the mass ratio of polyol to borate is less than or equal to about 3:1.

* * * * *